May 21, 1929.　　　O. A. REEVES　　　1,713,624
ANIMAL HOLDER
Filed July 6, 1927
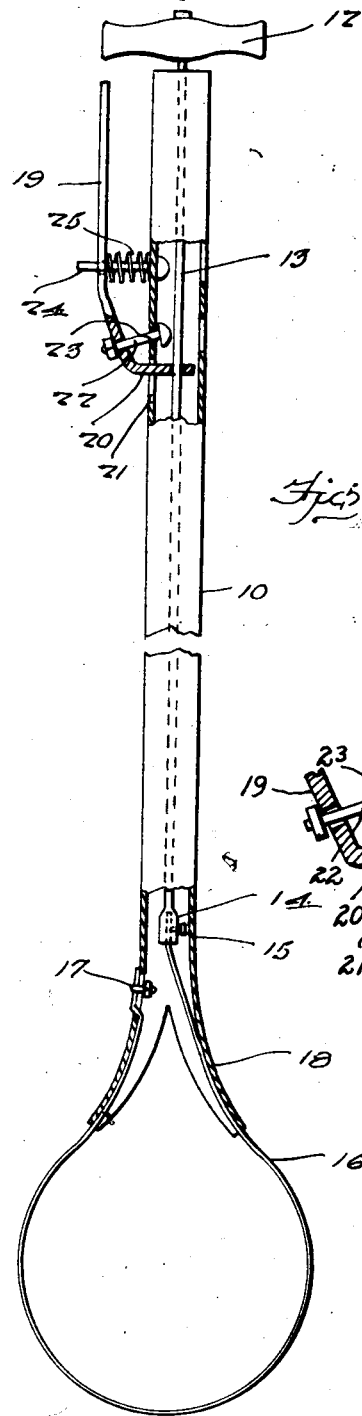
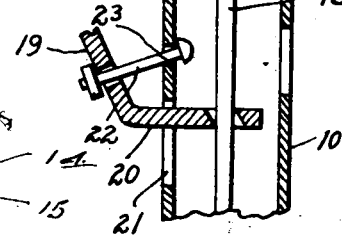
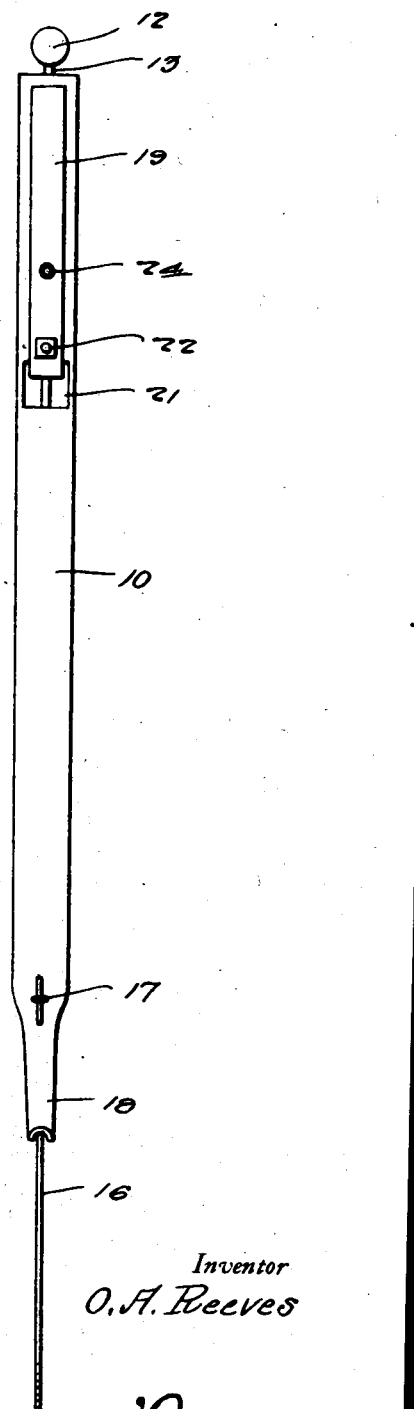
Inventor
O. A. Reeves
By Clarence A. O'Brien
Attorney Patented May 21, 1929.

1,713,624

UNITED STATES PATENT OFFICE.

ODA AUGUSTA REEVES, OF DEVENTER, MISSISSIPPI.

ANIMAL HOLDER.

Application filed July 6, 1927. Serial No. 203,784.

The present invention relates to an animal holder and has for its object to provide a device of this class which is simple in its construction, strong and durable, inexpensive to manufacture, thoroughly efficient and reliable for catching and holding hogs by providing a loop which may be placed over the animal's nose and then drawn tight to securely hold the animal for ringing and vaccination purposes.

My invention consists in certain details in the construction, arrangement and combination of the various parts of the device whereby the objects contemplated are attained, as is hereinafter more fully set forth and claimed and illustrated in the accompanying drawings, in which:

Figure 1 shows the entire device in partly sectional elevation,

Figure 2 is a similar view taken at right angles to that shown in Figure 1,

Figure 3 is an enlarged sectional detail view to illustrate a binding action of the lever with the rod.

Referring to the drawing, I have used the reference numeral 10 to indicate the tubular body portion of the device. This is open at both ends and one end thereof is formed to rest against one side of an animal's nose by forming a central longitudinal cut in the end of the tube and then bending the opposite sides outwardly and bending them over along their median longitudinal dimensions to provide channeled extensions flared outwardly from the center of the tube. The handle is indicated by the reference numeral 12 and a rigid rod 13 is fixed to the center of the handle, passes through the hollow tube and terminates in a socket 14 having a set screw 15 engaged therein for engaging one end of a wire 16 which is looped and has the other end thereof anchored by a bolt 17. This bolt 17 is located at the juncture of one of the channeled extensions 18 with the tubular body 10.

A spring lever 19 has a curved end 20 extending through an opening 21 in the tubular body 10 and is apertured so that the rod 13 may slide therethrough. A bolt 22 is passed through an aperture 23 in the tube 10 and is engaged with an intermediate portion of the spring lever 19. A pin 24 extends laterally from the tubular body 10 through an opening in the lever and a spring 25 is disposed about the pin so as to cause the lever to bind on the rod 13 so that the animal pulling on the wire cannot expand the loop.

In practical use, and assuming it is desired to catch an old hog, the operator grasps the tube 10 in one hand and the handle 12 in the other, the handle being place against the adjacent end of the tube, thus making a loop of the wire 16 as large as possible. The operator then approaches the animal and places the loop wire 16 over the animal's nose and then by quick outward movement of the handle 12 the loop wire is contracted in size until it closely fits about the end of the animal's nose and will be held in this condition by the lever 19. When it is desired to release the wire 16 the lever 19 may be pressed in toward the tube thus doing away with the binding action between the lever and the rod 13.

It is thought that the construction, operation, facility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It is apparent that changes in the details of construction, and in the combination and arrangement of parts may be resorted to without departing from the spirit or the scope of the invention as hereinafter claimed or sacrificing any of its advantages.

Having thus described my invention, what I claim as new is:—

1. An improved animal holder comprising a hollow tube having one end provided with a longitudinal cut, and having the opposite sides of said end curved along their longitudinal median dimensions to form channeled extensions diverging from each other away from the center of the tube, a wire anchored at one end to lie for a portion of its length in one channeled extension then to form a loop and then to lie in the other channeled extension, a rod slidable through the tube, means on the inner end of the rod to anchor the other end of the wire thereto, a spring lever, means for loosely mounting the spring lever on the tube, said tube having an opening through which one end of the spring lever passes, said one end of the spring lever having an opening through which the rod extends, a spring associated with the lever so that the end of the lever having the opening will attain a binding grip on the rod.

2. An improved animal holder comprising a hollow tube, a wire anchored at one end of the tube to form a loop and then to extend in said end of the tube, a rod slidable through the tube, means on the inner end of the rod to anchor the other end of the wire thereto, a lever, means for rockably mounting the lever on the tube, said tube having an opening through which one end of the lever passes, said one end of the lever having an opening through which the rod extends, and spring means pressing against the lever to cause the walls of the opening to bind on the rod.

In testimony whereof I affix my signature.

ODA AUGUSTA REEVES.